United States Patent
Khannur et al.

(10) Patent No.: US 7,979,034 B2
(45) Date of Patent: Jul. 12, 2011

(54) ARCHITECTURE FOR RFID TAG READER/WRITER

(75) Inventors: Pradeep B. Khannur, Singapore (SG); Sheng Jau Wong, Singapore (SG); Aruna B. Ajjikuttira, Singapore (SG); Jia Jun Zheng, Singapore (SG)

(73) Assignees: Agency for Science, Technology and Research, Singapore (SG); Cyrips Pte Ltd., Singapore (SG)

( * ) Notice: Subject to any disclaimer, the term of this patent is extended or adjusted under 35 U.S.C. 154(b) by 673 days.

(21) Appl. No.: 11/884,619

(22) PCT Filed: Feb. 18, 2005

(86) PCT No.: PCT/SG2005/000047
§ 371 (c)(1),
(2), (4) Date: Jun. 2, 2008

(87) PCT Pub. No.: WO2006/088431
PCT Pub. Date: Aug. 24, 2006

(65) Prior Publication Data
US 2008/0252421 A1  Oct. 16, 2008

(51) Int. Cl.
*H04B 1/38* (2006.01)
(52) U.S. Cl. .......... 455/73; 455/311; 455/314; 455/323; 455/325
(58) Field of Classification Search .......... 455/311, 455/315–325
See application file for complete search history.

(56) References Cited

FOREIGN PATENT DOCUMENTS

| WO | 0195243 | 12/2001 |
|---|---|---|
| WO | 03098821 | 11/2003 |
| WO | WO 03/098821 | 11/2003 |

OTHER PUBLICATIONS

International Search Report; PCT/SG2005/000047; mailed Apr. 8, 2005.
International Search Report, PCT/SG2005/000047, dated Aug. 30, 2007.

*Primary Examiner* — Zhiyu Lu
(74) *Attorney, Agent, or Firm* — Connolly Bove Lodge & Hutz LLP

(57) ABSTRACT

An RFID transceiver (200) includes a common frequency source (250), a receiving channel (230) and a transmitting channel (240). The common frequency source (250) is configured to provide a predefined intermediate frequency signal $f_{IF}$, and a predefined carrier frequency signal $f_c$. The RFID receiving channel (230) includes an upconverting mixer (232) having a first input coupled to receive the predefined intermediate frequency signal $f_{IF}$, a second input coupled to receive the predefined carrier frequency signal $f_c$, and an output, the upconverting mixer (232) operable to produce an upconverted signal at a frequency defined by $f_c \pm f_{IF}$. The RFID receiving channel (230) further includes an image rejection downconverting mixer (234) having a first input coupled to receive an RFID signal having a carrier frequency substantially at the predefined carrier frequency $f_c$, a second input coupled to receive the upconverted signal, and an output, the image rejection downconverting mixer (234) operable to produce an output a downconverted signal at substantially the predefined intermediate frequency $f_{IF}$. The RFID transmitting channel (240) includes a modulator (244) operable to modulate modulation data onto the predefined carrier frequency signal $f_c$.

21 Claims, 3 Drawing Sheets

ARCHITECTURE FOR RFID TAG READER/WRITER

CROSS-REFERENCE TO RELATED APPLICATIONS

This application is a national stage application under 35 USC §371(c) of PCT Application No. PCT/SG2005/000047, entitled "ARCHITECTURE FOR RFID READER/WRITER," filed Feb. 18, 2005, which is hereby incorporated by reference herein.

BACKGROUND

The present invention relates to radio frequency identification circuitry, and more particularly, to transceiver architectures for radio frequency identification systems.

Radio frequency identification (RFID) systems are wireless telemetry systems, whereby a transponder or RFID "tag" communicates information to an interrogation transceiver or RFID "reader." The information provided by the RFID tag may be location information, the tag's identity, or other data. Continued improvements in circuit miniaturization have resulted in very small RFID tags that can be unobtrusively placed on an item which is to provide the aforementioned telemetry. The RFID tag communicates the information to the RFID reader when interrogated, or otherwise activated to do so.

FIG. 1 illustrates a simplified block diagram of an RFID system. The system includes an RFID reader 110 and one or more RFID tags 120, between which RFID signals 102 are communicated. The RFID reader 110 operates as a transceiver whereby it transmits an interrogation signal 102a, and receives signal responses 102b from one or more of the RFID tags. The RFID reader 110 is shown with a single transmit/receive antenna, but may include different transmit and receive antennas (or more than one of each) to more effectively communicate with each of the RFID tags 120. The RFID reader 110 may be fixed, or handheld to permit mobile scanning and interrogation of an item. The RFID tags 120 may be battery-powered or passive, in which case the RFID tag obtains power from the transmitted signal 102 for its operation. The RFID tag 120 includes an antenna that may be in the printed form to maintain the tag's small footprint. The system may employ frequency or signal polarization diversity or anti-collision protocols to permit greater communication ability.

A central component of the RFID system is the transceiver or RFID reader 110. Conventionally, the receiver portion of the RFID reader 110 has been designed using either a homodyne mixing approach or a superheterodyne mixing approach. The homodyne mixing approach provides advantages in that the circuit architecture is relatively simple and generally power efficient. The difficulties with such a direct conversion receiver are well known and include dynamically varying DC offset level, I/Q mismatch, and erroneous baseband signals generated by the cross-modulation of the RF signal (i.e., the received RFID signal) and the LO signal (the internally generated reference signal).

The superheterodyne mixing approach provides some relief to the aforementioned obstacles, but at significant expense. The superheterodyne design provides relatively good image rejection using an image rejection mixer and corresponding frequency synthesizer. The disadvantage of such a system is that it creates a requirement for an additional frequency synthesizer, as the transmitting and receiving channels typically require their own frequency source in this design. The presence of both frequency synthesizers decreases available chip real estate and drains much needed power.

Accordingly, what is needed is an improved transceiver architecture which provides good image rejection through the implementation of fewer circuit components.

SUMMARY OF THE INVENTION

The present invention provides an improved RFID transceiver architecture which exhibits good image rejection while using a single frequency source common to the transceiver's transmitting and receiving channels. As a result, the RFID transceiver operates on less power and requires less IC real estate.

In an exemplary embodiment, an RFID transceiver includes a common frequency source, a receiving channel and a transmitting channel. The common frequency source is configured to provide a predefined intermediate frequency signal $f_{IF}$, and a predefined carrier frequency signal $f_C$. The RFID receiving channel includes a single sideband up-converting mixer having a first input coupled to receive the predefined intermediate frequency signal $f_{IF}$, a second input coupled to receive the predefined carrier frequency signal $f_C$, and an output, the SSB upconverting mixer operable to produce an upconverted signal at a frequency defined by $f_C \pm f_{IF}$. The RFID receiving channel further includes an image rejection downconverting mixer having a first input coupled to receive an RFID signal having a carrier frequency substantially at the predefined carrier frequency $f_C$, a second input coupled to receive the upconverted signal, and an output, the image rejection mixer operable to produce an output a downconverted signal at substantially the predefined intermediate frequency $f_{IF}$. The RFID transmitting channel includes a modulator operable to combine modulation data onto the predefined carrier frequency signal $f_C$.

These and other features of the invention will be better understood in view of the drawings and corresponding description as provided below.

DETAILED DESCRIPTION

Figure 1:
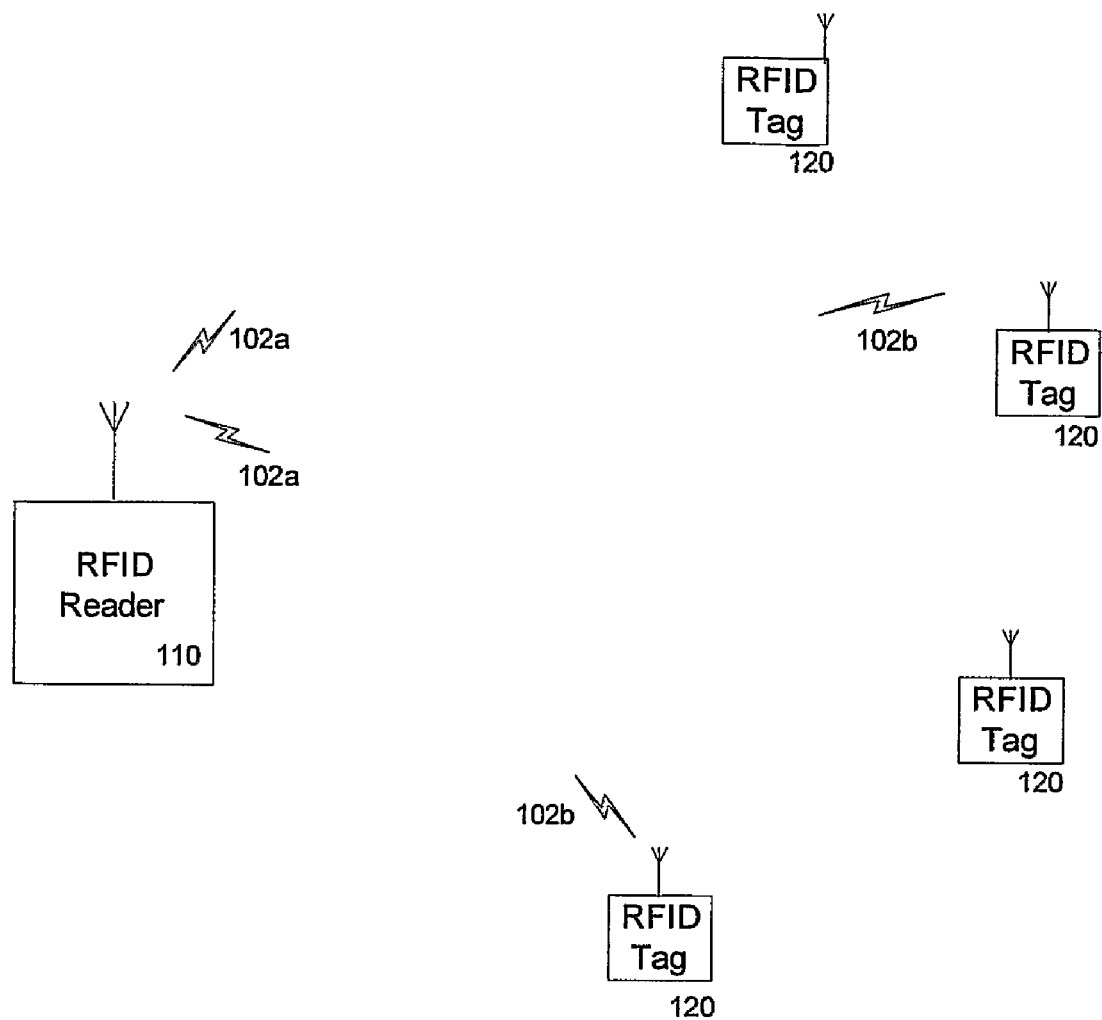
FIG. 1 illustrates a simplified block diagram of an RFID system employing an RFID Reader and one or more RFID Tags as known in the art.
Figure 2:
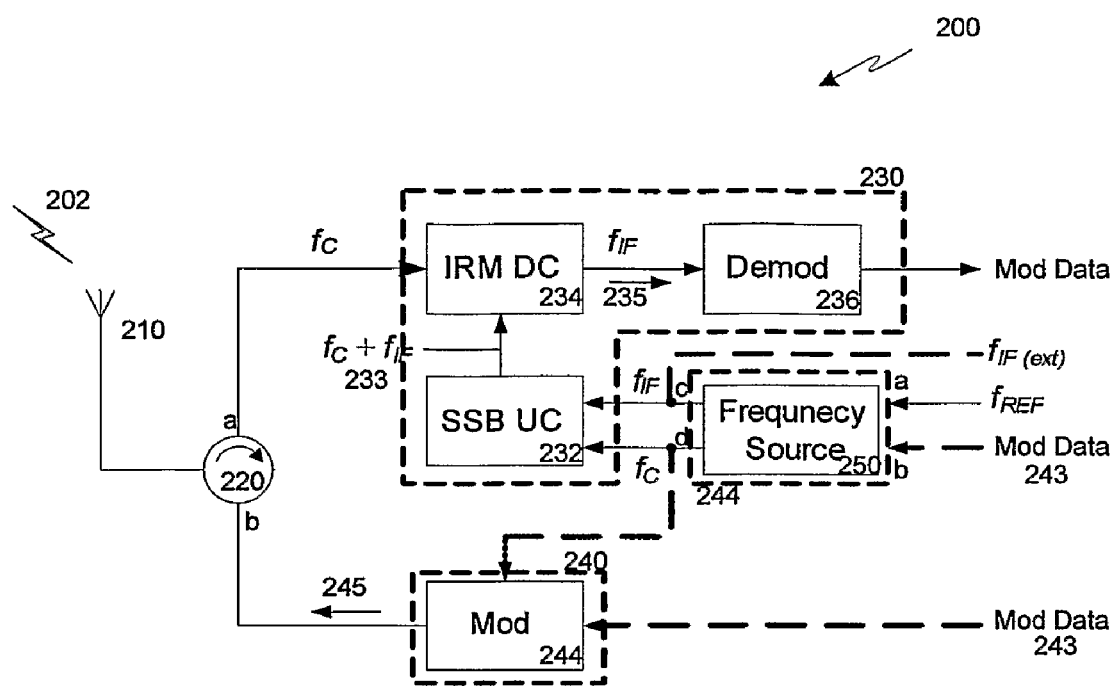
FIG. 2 illustrates a simplified block diagram of an RFID transceiver in accordance with one embodiment of the present invention.

FIG. 2 illustrates a block diagram of a RFID transceiver in accordance with one embodiment of the present invention. The transceiver 200 includes an antenna 210, a circulator 220, an RFID receiving channel 230, an RFID transmitting channel 240, and a common frequency source 250. The RFID receiving channel 230 includes a single sideband upconverting mixer 232, an image rejection down converting mixer 234, and a demodulator 236. The RFID transmitting channel 240 includes a modulator 244, which in a particular embodiment (indicated by the dashed lines) includes the common frequency source.

The antenna 210 is operable to transmit RFID signal 202, which may be in the form of amplitude shift-keyed (ASK), on-off keyed (OOK), frequency shift-keyed (FSK) formatted signals and to receive RFID signal 202, which may be in the form of amplitude shift-keyed (ASK), on-off keyed (OOK), frequency shift-keyed (FSK) or phase shift-keyed (PSK) formatted signals. Circulator 220 provides isolation between the transmitting and receiving channels 230 and 240 during respective transmit and receive operations. Common frequency source 250 receives a reference frequency signal $f_{REF}$, and therefrom provides a predefined intermediate frequency signal $f_{IF}$ and a predefined carrier frequency signal $f_C$ used in the transmitting and receiving operations. In an alternative embodiment, intermediate frequency signal $f_{IF}$ is provided from an external source ($f_{IFext}$) In particular, the common frequency source includes a single phase-locked loop, an RF oscillator, crystal reference oscillator, reference divider, etc., further described below.

In a specific embodiment, the receiving channel 230 includes a single sideband upconversion (SSB UC) mixer 232 and an image rejection downconversion (IRM DC) mixer 234. The single sideband up-converting mixer 232 receives the intermediate and carrier frequency signals $f_{IF}$ and $f_C$, respectively, and in response, generates an upconverted signal 233 operating at a frequency defined by $f_C \pm f_{IF}$, depending on sideband selection. The single sideband upconversion mixer architecture, as known to the skilled in the art, is operable to attenuate the signal level of the carrier frequency $f_C$, the intermediate frequency, $f_{IF}$, the unselected mixing product, harmonics and mixing products thereof greatly below the signal level of the output mixing product. For example, mixer signal rejection of the aforementioned signals may be on the order of 30-40 dB relative to the selected mixing product. The image rejection downconverting mixer 234 receives the RFID signal 202 (via the receive channel port 220a of the circulator 220) and the upconverted signal 233, and in response produces a frequency translated version of the RFID signal having frequency substantially at $f_{IF}$. Downconverted signal 235 is provided to demodulation circuitry 236 (which may be analog or digital) operable to extract the baseband information from the received RFID signal. The demodulator 236 may be an ASK, OOK, FSK, or PSK demodulator.

The RFID transmitting channel 240 includes a modulator 244, which may be formed as a part of the common frequency source when FSK modulation format is used, or as an independent modulator when ASK or OOK modulation is employed. Each embodiment is further described below.

Common frequency source 250 includes a first input 250a coupled to receive a reference frequency signal $f_{REF}$, a first output 250c for providing the predefined intermediate frequency signal $f_{IF}$, and a second output 250d for providing the predefined carrier frequency signal $f_C$. In a particular embodiment, the common frequency source 250 is a phase locked-loop frequency synthesizer operable to generate the predefined carrier frequency signal $f_c$ using the RF oscillator and supplied reference frequency signal $f_{REF}$. In a further specific embodiment, the predefined intermediate frequency signal $f_{IF}$ is the reference frequency signal itself. The common frequency source 250 may additionally operate as the transmitting channel modulator 244. In such an instance, the common frequency source 250 includes a second input 250b operable to receive modulation data 243 for modulating the frequency of the carrier signal $f_C$. The FSK modulated carrier signal 245 is supplied to the antenna from which it is transmitted to one or more RFID tags.

Figure 3:
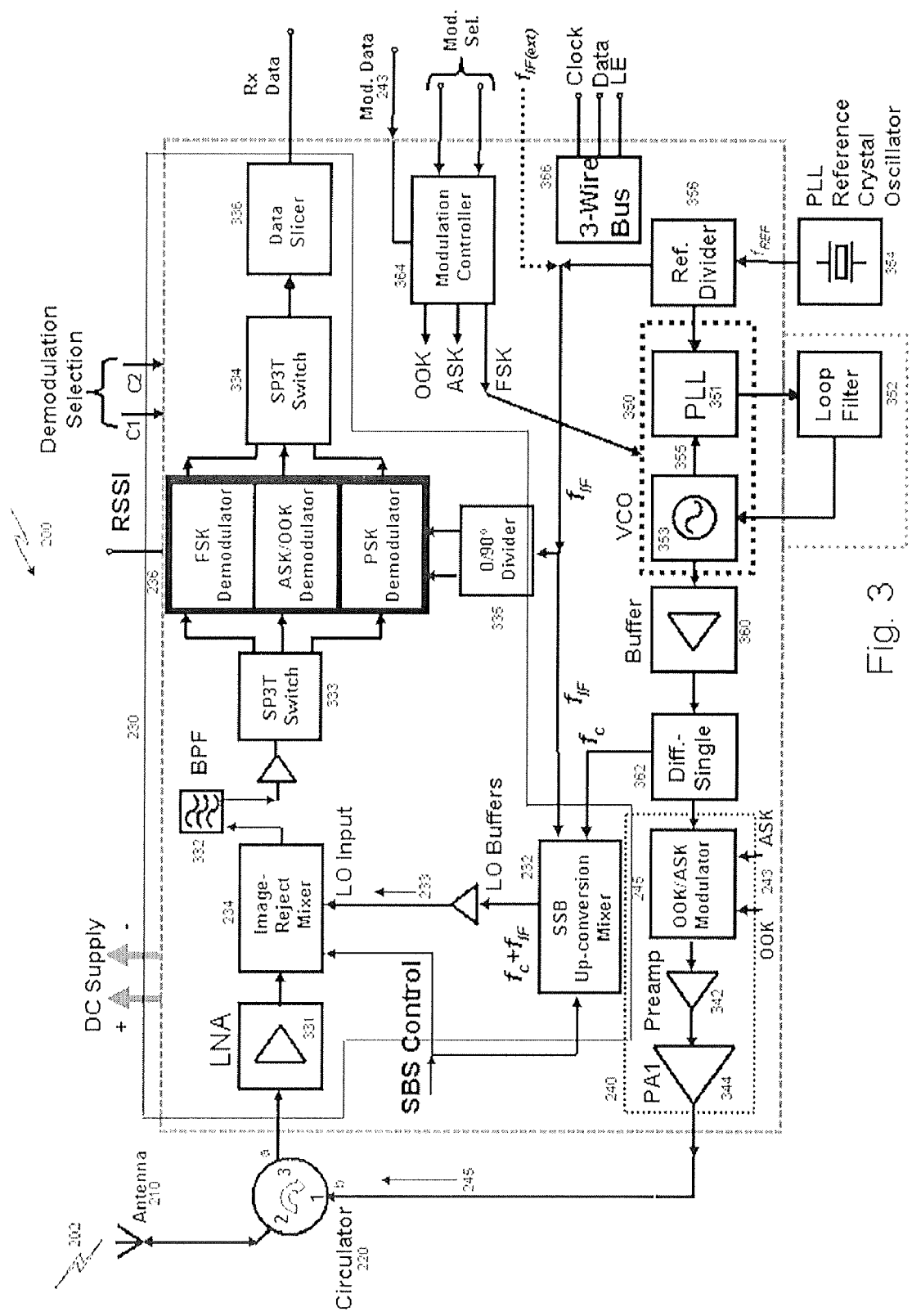
FIG. 3 illustrates a detailed block diagram of an RFID transceiver in accordance with one embodiment of the present invention.

FIG. 3 illustrates a detailed system block diagram of a RFID transceiver in accordance with the present invention, with previously identified features retaining their reference numerals. The RFID receiving channel 230, in addition to the previously mentioned components, includes a front-end amplifier 331 (e.g., a low noise amplifier), a filter 332 (which may be implemented as a discrete component), first and second single pole-triple throw (SP3T) switches 333 and 334, a quadrature phase power divider 335, and a data slicer 336. LNA 331 is operable to amplify the received signal strength of the RFID signal to a desired power level with a minimum of added noise power. Filter 332, which in a particular embodiment is a bandpass filter centered around $f_{IF}$, is operable to provide further selectivity by attenuating closely occurring interferors. First and second SP3T switches 333 and 334 are operable to complete the signal path through the RFID receiving channel via one of three demodulators 236, illustrated as an FSK demodulator, an ASK/OOK demodulator, and a PSK demodulator. A quadrature phase power divider 335 (e.g., a polyphase filter) provides 0° and 90° versions of the IF frequency signal $f_{IF}$ which are used within the demodulator bank to extract the RFID Tag data from the carrier frequency signal $f_C$. The demodulator output is supplied to the data slicer 336, which recovers the modulation data transmitted from the RFID Tag. The baseband processing circuitry (not shown in FIG. 3) performs further operations (decoding, etc.) to render the RFID Tag modulated data.

The RFID transmitting channel 240 includes a modulator 244, a preamplifier 342, and a power amplifier 344. Modulator 244 is configured to operate as an OOK/ASK modulator, whereby the on-off/amplitude state of the switches 244 changes responsive to the supplied modulation signal 243. Alternatively, the modulator 244 is implemented as a PLL (an exemplary embodiment of which is further detailed below) in direct-modulation for generating an FSK modulated signal, or further alternatively as a sigma-delta modulator based fractional-N PLL synthesizer to produce an FSK modulated signal. In both of the aforementioned cases the modulation data is supplied to the PLL synthesizer, which in turn produces an FSK modulated carrier signal responsive to the supplied modulation data.

The illustrated embodiment of the common frequency source includes a phase locked loop frequency synthesizer 350 having a reference divider 356, a phase/frequency detector of PLL 351, a loop filter 352, a voltage-controlled oscillator (VCO) 353 and a reference crystal oscillator 354. A reference frequency signal $f_{REF}$ is generated by the reference crystal oscillator 354 and is supplied to the reference divider 356. The reference divider 356 is operable to reduce the frequency (divide) the supplied reference frequency by any desired factor, including no reduction, i.e., a division factor of 1. The reference divider 356 is operable to output a first divided reference signal to the phase/frequency detector (PFD) of PLL 351, a second divided reference signal to the SSB up-conversion mixer 232, and a third divided reference signal to the 0°/90° divider 335. In a specific embodiment of the invention, the first, second and third divided reference signals are at the same frequency, although in an alternative embodiment the first, second and/or third divided reference signals operate at different frequencies. The VCO control voltage output from PFD of PLL 351 is filtered in loop filter 352 which can be inside or outside the chip. The filtered VCO control signal is used as control voltage input to VCO 353 completing the loop. In a particular embodiment, the second and third divided reference signals supplying the SSB mixer 232 and the 0°/90° divider 335 operate at a predefined intermediate frequency signal $f_{IF}$. Alternatively, the predefined intermediate frequency signal $f_{IF}$ is supplied from an external source ($f_{IFext}$).

The loop filter 352 receives the VCO control voltage and provides a filtered version thereof to the VCO 353. The VCO generates a predefined carrier signal $f_C$, which is substantially the frequency of the received RFID signal 202. The VCO also produces a phase/frequency feedback signal 355 (referred to as an error signal herein) for indicating the phase or frequency of the carrier reference signal $f_C$ produced. The error signal 355 is supplied to the PFD in the PLL 351 which compares it with the reference signal, and adjusts the generated output voltage accordingly. A buffer amplifier 360 is operable to receive and amplify the carrier frequency signal $f_C$, as well as to provide load isolation. A differential to single-ended stage 362 (e.g., a balun or active differential to single-ended converter) is used to convert between the differential output of the buffer amplifier 360 and the single-ended input of the modulator 244.

In a specific embodiment, the modulator 244 includes the VCO 353. In such an instance, the VCO 353 includes an input for receiving FSK modulation data 243, whereby the frequency of the generated carrier frequency signal $f_C$ is modulated. In such an embodiment, modulator 244 is disabled or omitted from the design. The RFID transceiver, as shown, further includes a modulation controller 364 for routing the modulation data 243 to either the VCO 353 (when FSK modulation is employed), or to the modulator 244 (when ASK or OOK modulation is used). Clock, data, and latch enable signals are carried via a three wire bus 366 to the phase locked loop, reference divider 356 and are operable to define the carrier frequency signal $f_C$ in a particular embodiment.

While the above is a detailed description of the present invention, it is only exemplary and various modifications, alterations and equivalents may be employed in various apparati and processes described herein. Accordingly, the scope of the present invention is hereby defined by the metes and bounds of the following claims.

What is claimed is:

1. A radio frequency identification (RFID) transceiver, comprising:
    a common frequency source configured to provide (i) a predefined intermediate frequency signal $f_{IF}$, and (ii) a predefined carrier frequency signal $f_C$;
    an RFID receiving channel, comprising:
        a single sideband upconverting mixer having a first input coupled to receive the predefined intermediate frequency signal $f_{IF}$, a second input coupled to receive the predefined carrier frequency signal $f_C$, and an output, the single sideband upconverting mixer operable to produce an upconverted signal at a frequency defined by $f_C \pm f_{IF}$;
        an image rejection downconverting mixer having a first input coupled to receive an RFID signal having a carrier frequency substantially at the predefined carrier frequency $f_C$, a second input coupled to receive the upconverted signal, and an output, the image rejection mixer operable to produce a downconverted signal at substantially the predefined intermediate frequency $f_{IF}$; and
    an RFID transmitting channel comprising a modulator operable to modulate modulation data onto the predefined carrier frequency signal $f_C$.

2. The RFID transceiver of claim 1, wherein the single sideband upconverting mixer, the image rejection downconvertering mixer, and the modulator are monolithically formed on an integrated circuit.

3. The RFID transceiver of claim 1, further comprising a buffer amplifier coupled between the common frequency source and the modulator.

4. The RFID transceiver of claim 1, wherein the modulator comprises a switch having a first input coupled to receive the predefined carrier frequency signal $f_C$, a second input coupled to receive modulation data, the switch operable to switch between a plurality of states responsive to the supplied modulation signal.

5. The RFID transceiver of claim 1, wherein the receiving channel further comprises a demodulator having an input coupled to output of the image rejection downconverting mixer and an output for providing baseband data modulated on the received RFID signal.

6. The RFID transceiver of claim 5, wherein the demodulator consists of a demodulator from the group consisting of a frequency shift-keyed demodulator, an amplitude shift-keyed demodulator, an on-off keyed demodulator, or a phase shift-keyed demodulator.

7. The RFID transceiver of claim 1, wherein the common frequency source comprises a phase locked loop, further comprising:
    a phase-frequency detector having a first input coupled to receive a reference frequency signal $f_{REF}$ or frequency divided version thereof, a second input to receive an error signal, the phase-frequency detector operable to output a VCO control voltage;
    a loop filter having an input coupled to receive the VCO control voltage signal and an output to provide a filtered VCO control voltage signal; and
    a voltage-controlled oscillator having an input coupled to receive the filtered VCO control voltage signal, the voltage controlled oscillator operable to produce the carrier frequency signal.

8. The RFID transceiver of claim 7, wherein no additional phase locked loops are implemented in either the receiving channel or the transmitting channel.

9. The RFID transceiver of claim 7, wherein the predetermined intermediate frequency $f_{IF}$ is substantially the reference frequency $f_{REF}$ or a frequency divided version thereof.

10. The RFID transceiver of claim 1, wherein the modulator comprises (i) a phase-locked loop in direct-modulation for generating an FSK modulated signal, or (ii) a sigma-delta modulator based fractional-N PLL synthesizer to produce an FSK modulated signal, wherein the modulation data supplied to the PLL synthesizer produces an FSK modulated carrier signal.

11. The RFID transceiver of claim 7, wherein the single sideband upconverting mixer, the image rejection downconverting mixer, the modulator, the voltage-controlled oscillator, and the PLL are monolithically formed on an integrated circuit.

12. An radio frequency identification (RFID) transceiver, comprising:
    a single phase locked loop configured to provide (i) a predefined intermediate frequency signal $f_{IF}$, and (ii) a predefined carrier frequency signal $f_C$;
    an RFID receiving channel, comprising:
        a single sideband upconverting mixer having a first input coupled to receive the predefined intermediate frequency signal $f_{IF}$, a second input coupled to receive the predefined carrier frequency signal $f_C$, and an output, the single sideband upconverting mixer operable to produce an upconverted signal at a frequency defined by $f_C \pm f_{IF}$.
        an image rejection downconverting mixer having a first input coupled to receive an RFID signal having a carrier frequency substantially at the predefined carrier frequency $f_C$, a second input coupled to receive the upconverted signal, and an output, the second image rejection mixer operable to produce an output a downconverted signal at substantially the predefined intermediate frequency $f_{IF}$; and an RFID transmitting channel comprising a modulator operable to modulate the modulation data onto the predefined carrier frequency signal $f_C$.

13. The RFID transceiver of claim 12, wherein the single phase locked loop comprises:
    a phase-frequency detector having a first input coupled to receive a reference frequency signal $f_{REF}$ or frequency divided version thereof, a second input to receive an error signal, the phase-frequency detector operable to output a VCO control voltage;
    a loop filter having an input coupled to receive the VCO control voltage signal and an output to provide a filtered VCO control voltage signal; and
    a voltage-controlled oscillator having an input coupled to receive the filtered VCO control voltage signal, the voltage controlled oscillator operable to produce the carrier frequency signal; and
    a buffer amplifier having an input coupled to the output of the voltage-controlled oscillator and an output.

14. The RFID transceiver of claim 13, wherein the receiving channel further comprises a demodulator having an input coupled to the output of the image rejection downconverting mixer and an output, the demodulator comprising a demodulator selected from the group consisting of a frequency shift-keyed demodulator, an amplitude shift-keyed demodulator, an on-off keyed demodulator, and a phase shift-keyed demodulator.

15. The RFID transceiver of claim 13, wherein the predetermined intermediate frequency $f_{IF}$ is substantially the reference frequency $f_{REF}$ or a frequency divided version thereof.

16. The RFID transceiver of claim 13, wherein the modulator comprises a switch having a first input coupled to receive the predefined carrier frequency signal $f_C$, a second input coupled to receive modulation data, the switch operable to switch between a plurality of states responsive to the supplied modulation signal.

17. The RFID transceiver of claim 13, wherein the modulator comprises the voltage controlled oscillator coupled to receive modulation data, and to produce an FSK modulated carrier signal responsive to the supplied modulation data.

18. An radio frequency identification (RFID) transceiver, comprising:
    an antenna operable to receive an RFID signal;
    a circulator having a port 2 coupled to the antenna for transmitting/receiving the RFID signal, a port 3 for receiving a modulated RFID signal, and a port 1;
    a front-end amplifier having an input coupled to the circulator port 3 and an output;
    a single phase locked loop configured to provide (i) a predefined intermediate frequency signal $f_{IF}$, and (ii) a predefined carrier frequency signal $f_C$;
    an RFID receiving channel having an input coupled to the input of the front-end amplifier and an output, the RFID receiving channel comprising:
        a single sideband upconverting mixer having a first input coupled to receive the predefined intermediate frequency signal $f_{IF}$, a second input coupled to receive the predefined carrier frequency signal $f_C$, and an output, the single sideband upconverting mixer operable to produce an upconverted signal at a frequency defined by $f_C \pm f_{IF}$;
        an image rejection downconverting mixer having a first input coupled to receive an RFID signal having a carrier frequency substantially at the predefined carrier frequency $f_C$, a second input coupled to receive the upconverted signal, and an output, the image rejection mixer operable to produce an output a downconverted signal at substantially the predefined intermediate frequency $f_{IF}$; and
    an RFID transmitting channel having an output coupled to port 1 of the circulator, the RFID transmitting channel comprising:
        a modulator operable to modulate the modulation data onto the predefined carrier frequency signal $f_C$; and
        a power amplifier having an input coupled to the output of the modulator and an output coupled to the port 1 of the circulator.

19. The RFID transceiver of claim 17, wherein the receiving channel further comprises a demodulator having an input coupled to the output of the image rejection downconverting mixer and an output, the demodulator comprising a demodulator selected from the group consisting of a frequency shift-keyed demodulator, an amplitude shift-keyed demodulator, an on-off keyed demodulator, and a phase shift-keyed demodulator.

20. The RFID transceiver of claim 17, wherein the single phase locked loop comprises:
    a phase-frequency detector having a first input coupled to receive a reference frequency signal $f_{REF}$ or frequency divided version thereof, a second input to receive an error signal, the phase-frequency detector operable to output a VCO control voltage;
    a loop filter having an input coupled to receive the VCO control voltage signal and an output to provide a filtered VCO control voltage signal; and
    a voltage-controlled oscillator having an input coupled to receive the filtered VCO control voltage signal, the voltage controlled oscillator operable to produce the carrier frequency signal; and
    a buffer amplifier having an input coupled to the output of the voltage-controlled oscillator and an output.

21. The RFID transceiver of claim 1, wherein the modulator comprises (i) a phase-locked loop in direct-modulation for generating an FSK modulated signal, or (ii) a sigma-delta modulator based fractional-N PLL synthesizer to produce an FSK modulated signal, wherein the modulation data supplied to the PLL synthesizer produces an FSK modulated carrier signal.

* * * * *